(12) United States Patent
Lin (10) Patent No.: US 9,882,451 B2
(45) Date of Patent: Jan. 30, 2018

(54) AUTOMATIC FLUSH SENSING ASSEMBLY (71) Applicants: KING FAVOR INTERNATIONAL CO., LTD., Changhua, Changhua County (TW); Hui-Huang Lin, Changhua, Changhua County (TW)

(72) Inventor: Hui-Huang Lin, Changhua, Changhua County (TW)

(73) Assignees: KING FAVOR INTERNATIONAL CO., LTD., Changhua (TW); Hui-Huang Lin, Changhua (TW)

( * ) Notice: Subject to any disclaimer, the term of this patent is extended or adjusted under 35 U.S.C. 154(b) by 291 days.

(21) Appl. No.: 14/608,189

(22) Filed: Jan. 29, 2015

(65) Prior Publication Data
US 2016/0222640 A1   Aug. 4, 2016

(51) Int. Cl.
| | |
|---|---|
| *E03D 1/00* | (2006.01) |
| *H02K 7/14* | (2006.01) |
| *H02K 7/116* | (2006.01) |
| *E03D 5/10* | (2006.01) |
| *H02K 11/20* | (2016.01) |
| *H02K 11/33* | (2016.01) |

(52) U.S. Cl.
CPC ............. *H02K 7/14* (2013.01); *E03D 5/105* (2013.01); *H02K 7/116* (2013.01); *H02K 11/20* (2016.01); *H02K 11/33* (2016.01)

(58) Field of Classification Search
USPC ............................................. 4/313
See application file for complete search history.

(56) References Cited

U.S. PATENT DOCUMENTS

2009/0077730 A1* 3/2009 Funari ................ E03D 1/306
4/313

* cited by examiner

*Primary Examiner* — Lauren Crane
(74) *Attorney, Agent, or Firm* — Ding Yu Tan (57) ABSTRACT

An automatic flush sensing assembly has a driving device, a handle and a securing member. The hook end of the securing frame of the driving device is hooked onto the tank and the assembling aperture of the housing faces the assembling hole of the toilet tank. The handle is attached onto the front sleeve, the outer thread is inserted from outside the tank through the assembling hole and the assembling aperture of the housing, the signal cable of the sensor is connected to the power supply and the motor in the housing, and the rear sleeve connected to the linkage member and the control rod is inserted through the assembling aperture. The semi-circular portion of the handle is placed in the inner groove of the linkage member and the control rod is placed above the arm of the switch. Finally, the cover is placed to cover the housing.

10 Claims, 10 Drawing Sheets

AUTOMATIC FLUSH SENSING ASSEMBLY

BACKGROUND OF THE INVENTION

1. Field of the Invention

The present invention relates to a flush assembly, and more particularly to an automatic flush sensing assembly.

2. Description of the Related Art

Typically, a toilet tank is connected to a toilet bowl, and a user can use a handle to control a plug between the toilet tank and the toilet bowl via a control rod which allows the water stored in the toilet tank to flow into toilet bowl. However, the handle is easily covered with germs or bacteria, especially in public restroom, which can be very unsanitary. Furthermore, current automatic flush sensing toilets are sold as one unit, therefore, it is expensive to provide a more hygiene environment.

Therefore, it is desirable to provide an automatic flush sensing assembly that can be installed onto the existing toilet which is to mitigate and/or obviate the aforementioned problems.

SUMMARY OF THE INVENTION

An objective of the present invention is to provide an automatic flush sensing assembly.

To achieve the above-mentioned objective, an automatic flush sensing assembly has a driving device, a handle and a securing member. The driving device has a power supply and a motor 1 electrically connected and disposed in a housing. The housing has a through hole, and the motor is connected to a switch extending through the through hole. The switch is provided with a rotable arm outside of the housing. The housing is further provided with a cover and an assembling aperture. The driving device further comprises a plurality of engaging protrusions on an outer surface of the housing and a securing frame with a hook end and a plurality of limiting slots at another end. By engaging the limiting slot and the engaging protrusion, the housing and the securing frame are secured together. An output end of the motor is connected to a gear set, and the gear set is connected to the switch. The gear set has a gear with a plurality of accepting holes, the switch further has a plurality of corresponding protrusions corresponding to the accepting holes, such that the corresponding protrusions engage with the accepting holes, and a bolt is employed to pass the switch and secure onto the gear. The handle has an inner space and a rod is disposed at an end of the inner space, and an end of the rod is provided with a semi-circular portion. The handle has a through aperture disposed at an upper surface and connected to the inner space. The inner space is figured to be covered by a bottom board, and the bottom board has a first assembling aperture corresponding to the rod. The first assembling aperture of the bottom board is provided with a plurality of openings. The bottom board is provided with a sensor in the inner space, and the sensor has a sensing member facing the through aperture of the handle and connected to a signal cable. The sensing member of the sensor transmits sensing light towards to the handle, with a distance between 3 cm-7 cm and a 1 to 5 minutes waiting time period, which can prevent accidental repeat. Furthermore, the sensing member is an LED structure, which provides night illumination. Moreover, the housing further has a stopping wall between the assembling aperture and the through hole to protect the power supply and the motor, and the stopping wall has an opened slot accepting the signal cable. The securing member has a front sleeve, a linkage member and a rear sleeve. The front sleeve has a second assembling aperture jacketed onto the rod, and an end of the front sleeve is distal from the handle provided with an outer thread. Another end with the outer thread of the front sleeve is provided with a plurality of protrusions surrounding the second assembling aperture, such that the protrusions of the front sleeve pass through the openings of the first assembling aperture to limit the handle and the securing member. Furthermore, a linear slot is disposed adjacent to the outer thread such that the signal cable of the sensor passes through the first assembling aperture, the second assembling aperture and the linear slot. The front sleeve is jacketed with a washer and provided with a ring portion corresponding to the washer for engagement. The outer thread of the front sleeve is inserted into the assembling aperture of the housing, and the signal cable is connected to the motor and the power supply. The rear sleeve is provided with a containment hole limiting the linkage member, and the containment hole is provided with an inner thread. Another end of the rear sleeve is inserted into the assembling aperture of the housing, the rear sleeve further has an annular slot at the end inserted into the assembling aperture, and a C-type hook corresponding to the annular slot is also provided, such that the C-type hook positions the rear sleeve onto the housing. The front sleeve and the rear sleeve are locked with each other via an engagement between the inner and outer threads, an end of the linkage member is connected to the rod of the handle, and an end of the rod is provided with a semi-circular portion. The linkage member is provided with an inner groove facing the handle, and the inner groove is configured to accept the semi-circular portion of the rod. The inner groove has a semicircular portion with a circumference extending across 190°-210° to provide a gap between the linkage member and the rod. Another end of the linkage member passes through the rear sleeve and is provided with an enlarged portion, the enlarged portion is secured with a control strip. The control rod is disposed across above the arm 1 of the switch.

The typical handle on the toilet tank needs to be removed to expose the assembling hole. The hook end of the securing frame of the driving device is hooked onto a front sidewall of the tank and the assembling aperture of the housing faces the assembling hole of the toilet tank. The housing is not covered with the cover, and the power supply, the motor, the gear set and the switch are all disposed in the housing. The handle is attached onto the front sleeve, the outer thread is inserted from outside the tank through the assembling hole and the assembling aperture of the housing, the signal cable of the sensor is connected from the linear slot to the power supply and the motor in the housing, and the rear sleeve connected to the linkage member and the control rod is inserted through the assembling aperture of the housing from inside of the tank. Furthermore, the C-type hook is secured onto the annular slot of the rear sleeve, the outer thread and the inner thread of the rear sleeve engages together, such that the semi-circular portion of the handle is placed in the inner groove of the linkage member and the control rod is placed above the arm of the switch. Finally, the cover is placed to cover the housing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
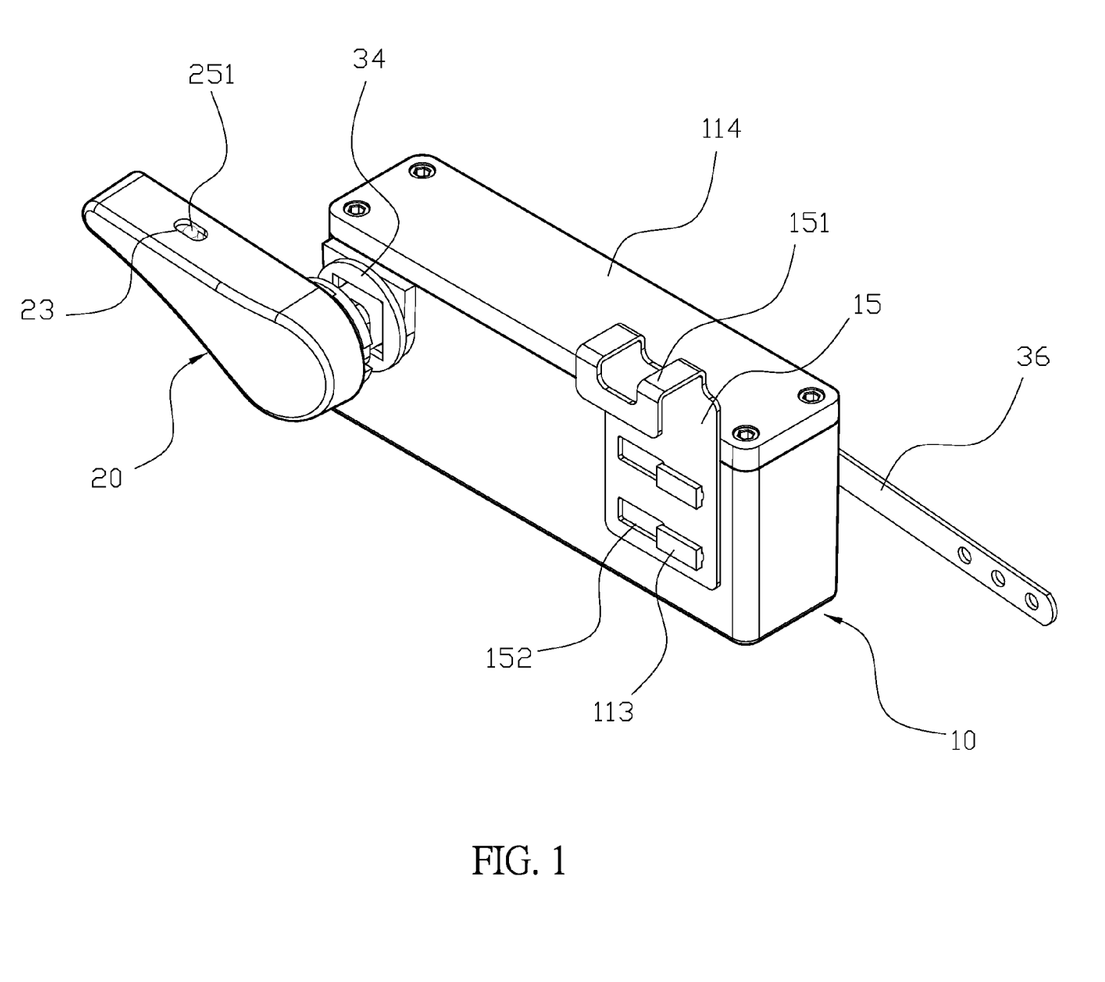
FIG. 1 is a perspective view of an embodiment of the present invention.
Figure 2:
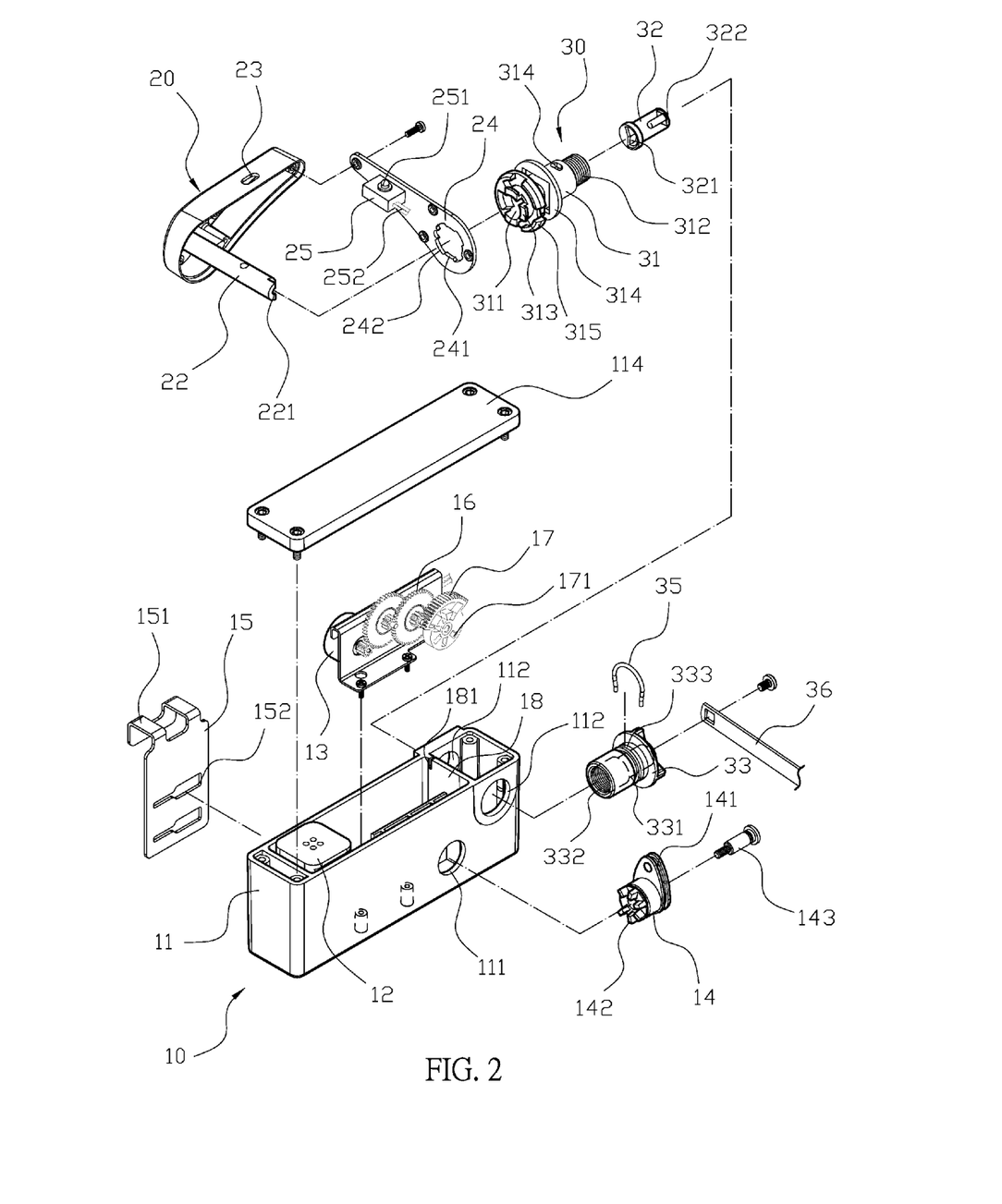
FIG. 2 is an exploded view of the embodiment of the present invention.

Please refer to FIG. 1 and FIG. 2. An automatic flush sensing assembly comprises a driving device 10, a handle 20 and a securing member 30. The driving device 10 has a power supply 12 and a motor 13 electrically connected and disposed in a housing 11. The housing 11 has a through hole 111, and the motor 13 is connected to a switch 14 extending through the through hole 111. The switch 14 is provided with a rotable arm 141 outside of the housing 11. The housing is further provided with a cover 114 and an assembling aperture 112. The driving device 10 further comprises a plurality of engaging protrusions 113 on an outer surface of the housing 11 and a securing frame 15 with a hook end 151 and a plurality of limiting slots 152 at another end. By engaging the limiting slot and 152 and the engaging protrusion 113, the housing 11 and the securing frame 15 are secured together. An output end of the motor 13 is connected to a gear set 16, and the gear set 16 is connected to the switch 14. The gear set 16 has a gear 17 with a plurality of accepting holes 171, the switch 14 further has a plurality of corresponding protrusions 142 corresponding to the accepting holes 171, such that the corresponding protrusions 142 engage with the accepting holes 171, and a bolt 143 is employed to pass the switch 14 and secure onto the gear 17. The handle 20 has an inner space 21 and a rod 22 is disposed at an end of the inner space 21, and an end of the rod 22 is provided with a semi-circular portion 221. The handle 20 has a through aperture 23 disposed at an upper surface and connected to the inner space 21. The inner space 21 is figured to be covered by a bottom board 24, and the bottom board 24 has a first assembling aperture 241 corresponding to the rod 22. The first assembling aperture 241 of the bottom board 24 is provided with a plurality of openings 242. The bottom board 24 is provided with a sensor 25 in the inner space 21, and the sensor 25 has a sensing member 251 facing the through aperture 23 of the handle 20 and connected to a signal cable 252. The sensing member 251 of the sensor 25 transmits sensing light towards to the handle 20, with a distance between 3 cm-7 cm and a 1 to 5 minute waiting time period, or with a distance between 3 cm-7 cm and a 5 second to 2 minute waiting time period, which can prevent accidental repeat. Furthermore, the sensing member 251 is an LED structure, which provides night illumination. Moreover, the housing 11 further has a stopping wall 18 between the assembling aperture 112 and the through hole 111 to protect the power supply 12 and the motor 13, and the stopping wall 18 has an opened slot 181 accepting the signal cable 252. The securing member 30 has a front sleeve 31, a linkage member 32 and a rear sleeve 33. The front sleeve 31 has a second assembling aperture 311 jacketed onto the rod 22, and an end of the front sleeve 31 is distal from the handle 20 provided with an outer thread 312. Another end with the outer thread 312 of the front sleeve 31 is provided with a plurality of protrusions 313 surrounding the second assembling aperture 311, such that the protrusions 313 of the front sleeve 31 pass through the openings 242 of the first assembling aperture 241 to limit the handle 20 and the securing member 30. Furthermore, a linear slot 314 is disposed adjacent to the outer thread 312 such that the signal cable 252 of the sensor 25 passes through the first assembling aperture 241, the second assembling aperture 311 and the linear slot 314. The front sleeve 31 is jacketed with a washer 34 and provided with a ring portion 315 corresponding to the washer 34 for engagement. The outer thread 312 of the front sleeve 31 is inserted into the assembling aperture 112 of the housing 11, and the signal cable 252 is connected to the motor 13 and the power supply 12. The rear sleeve 33 is provided with a containment hole 331 limiting the linkage member 32, and the containment hole 331 is provided with an inner thread 332. Another end of the rear sleeve 33 is inserted into the assembling aperture 112 of the housing 11, the rear sleeve 33 further has an annular slot 333 at the end inserted into the assembling aperture 112, and a C-type hook 35 corresponding to the annular slot 333 is also provided, such that the C-type hook 35 positions the rear sleeve 33 onto the housing 11. The front sleeve 31 and the rear sleeve 33 are locked with each other via an engagement between the inner and outer threads 332(312), An end of the linkage member 32 is connected to the rod 22 of the handle 20, and an end of the rod 22 is provided with a semi-circular portion 221. The linkage member 32 is provided with an inner groove 321 facing the handle 20, and the inner groove 321 is configured to accept the semi-circular portion 221 of the rod 22. The inner groove 321 has a semicircular portion with a circumference extending across 190°-210° to provide a gap between the linkage member 32 and the rod 22. Another end of the linkage member 32 passes through the rear sleeve 33 and is provided with an enlarged portion 322, the enlarged portion 322 is secured with a control strip 36. The control rod 36 is disposed across above the arm 141 of the switch 14. When the sensor 25 of the handle 20 is activated, the motor 13 drives the switch 14 to rotate the arm 141 to push the control strip 36, so the control rod 36 initiates water flush.

Figure 3:
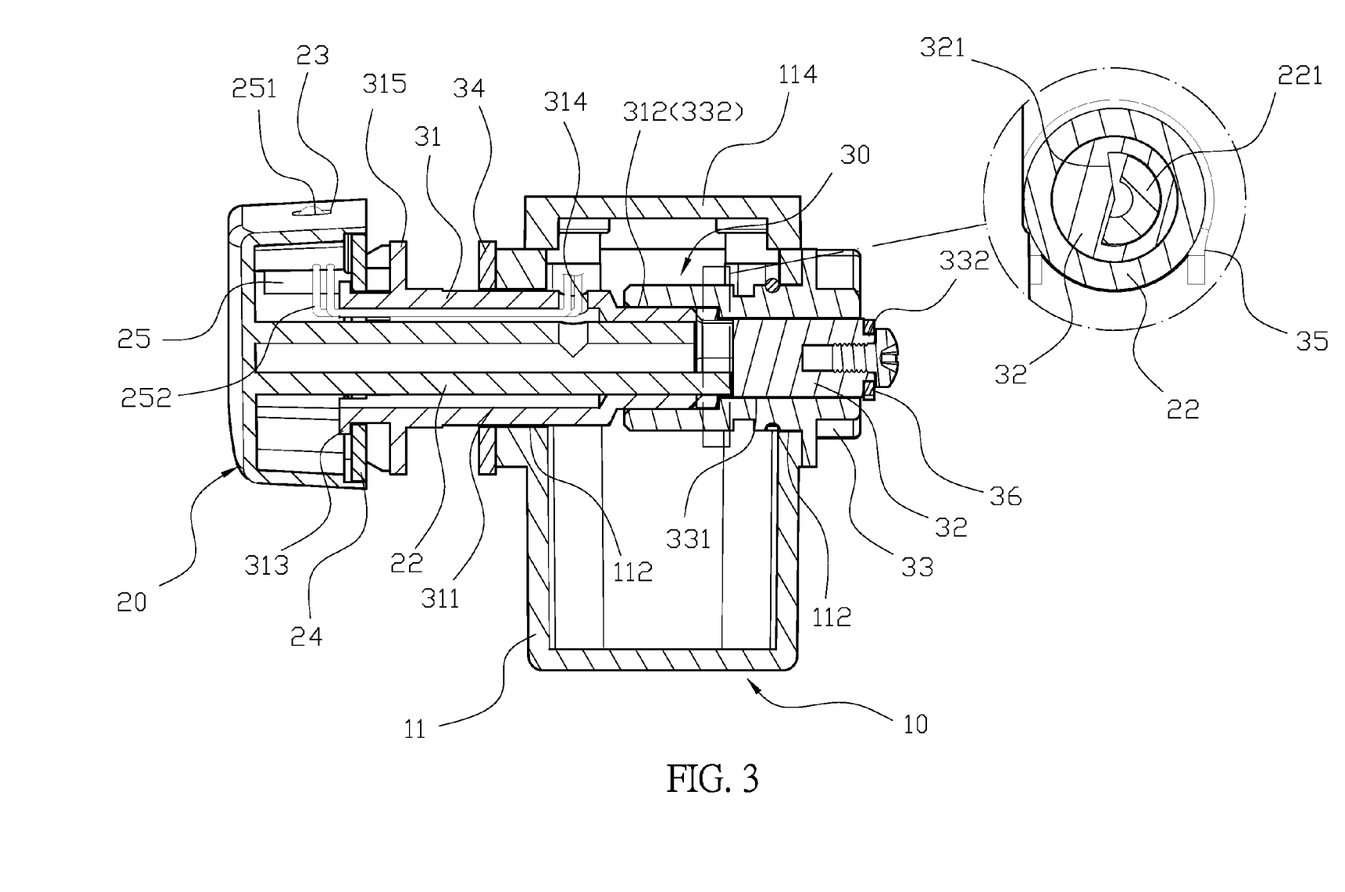
FIG. 3 is a cross-section view of the embodiment of the present invention.
Figure 4:
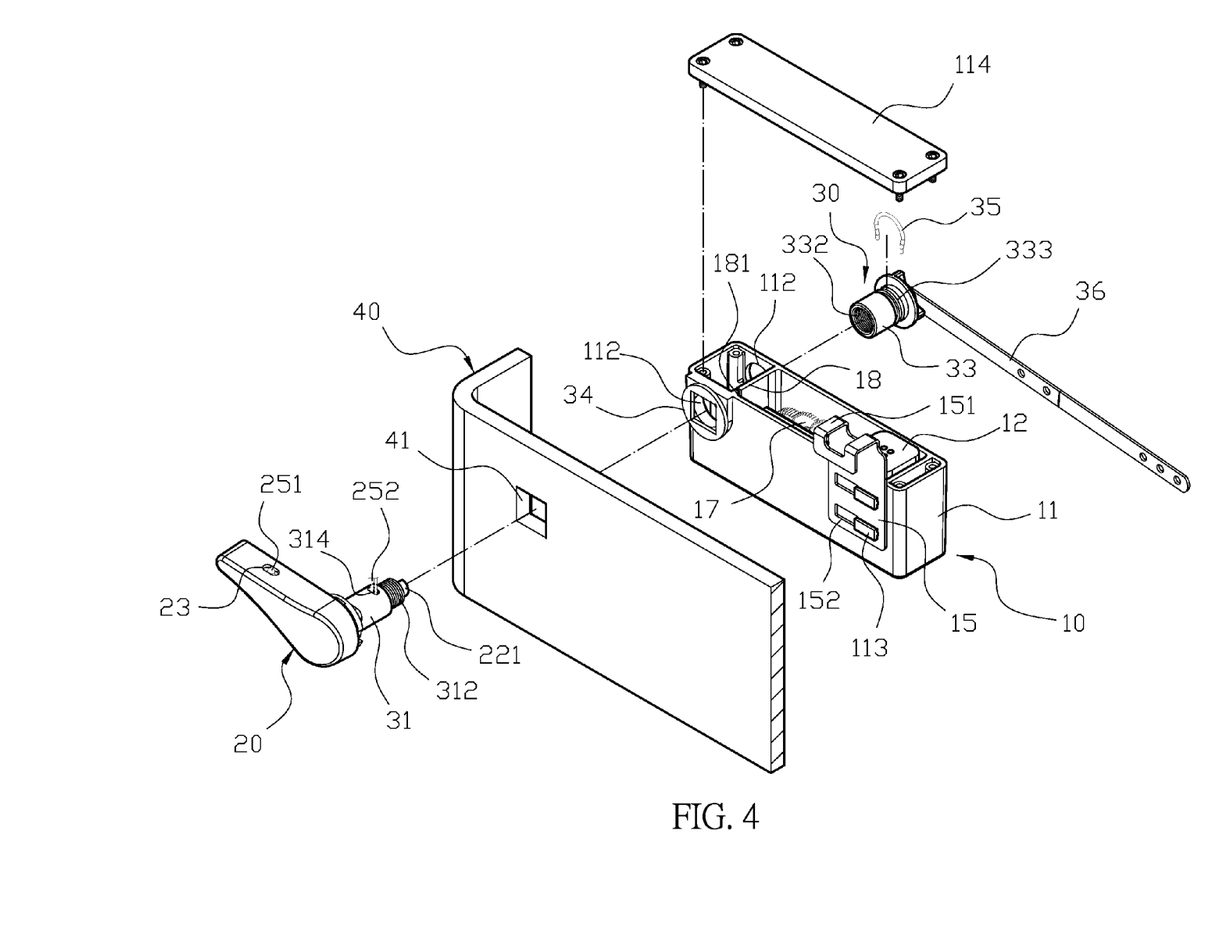
FIG. 4 is a schematic drawing of assembling the embodiment of the present invention.
Figure 5:
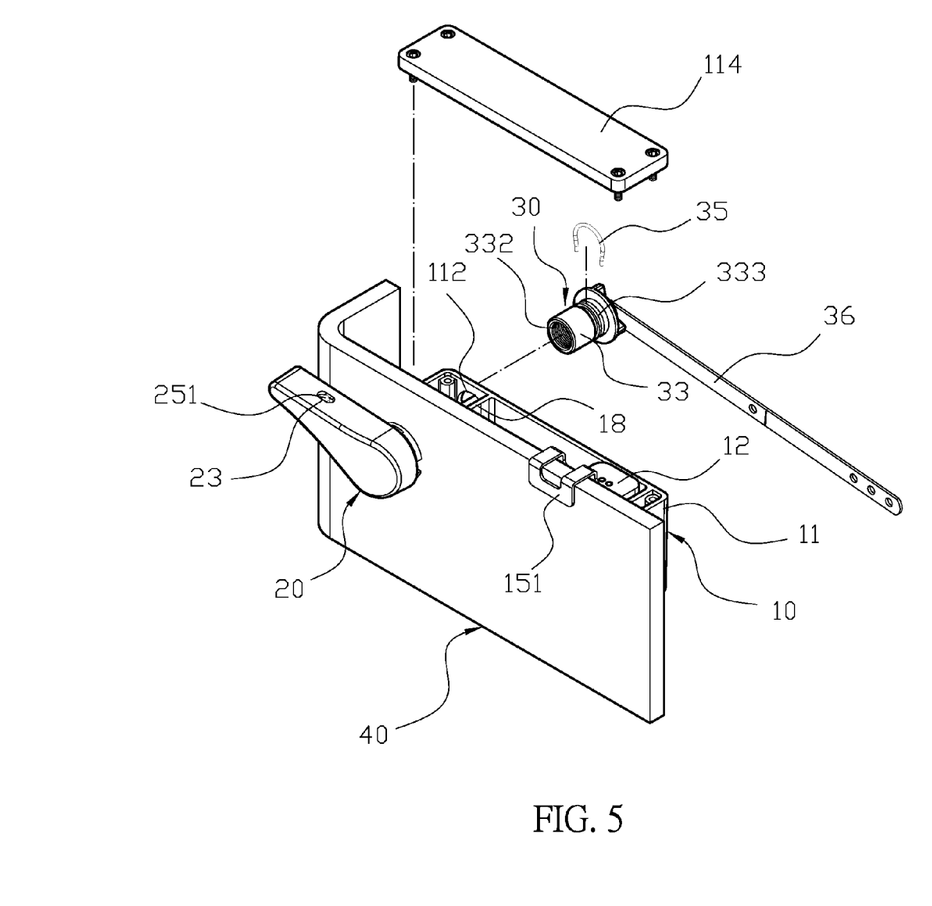
FIG. 5 is another schematic drawing of assembling the embodiment of the present invention.
Figure 6:
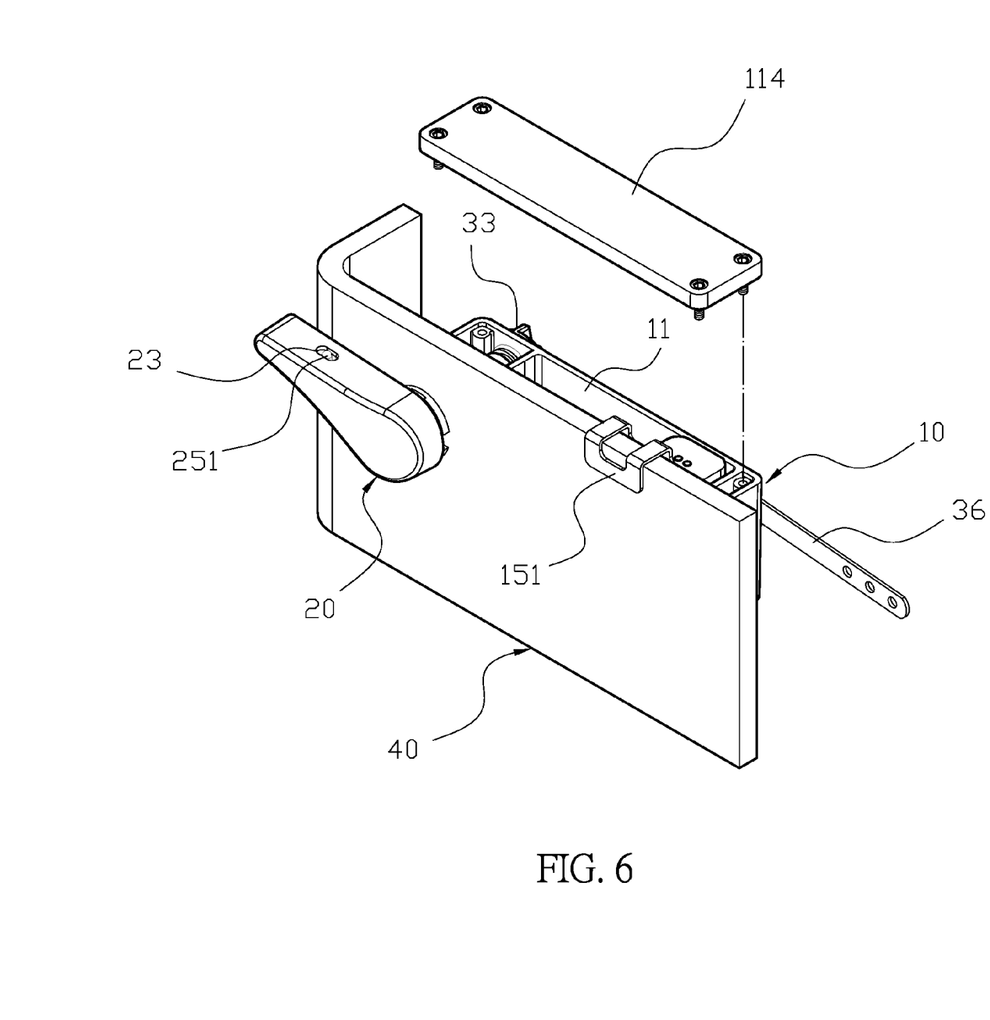
FIG. 6 is another schematic drawing of assembling the embodiment of the present invention.
Figure 7:
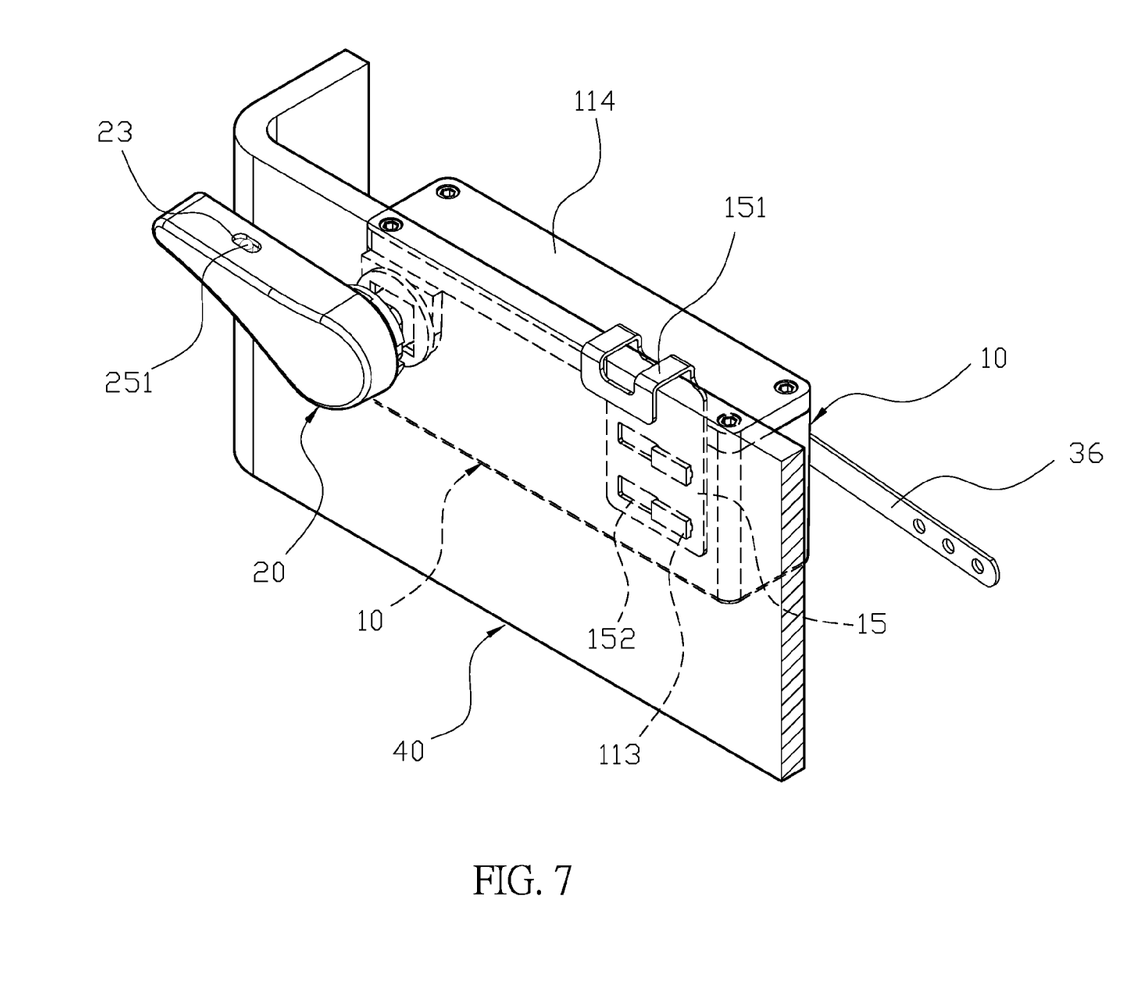
FIG. 7 is another schematic drawing of assembling the embodiment of the present invention.

For the structure assembly for the embodiment, please refer to FIGS. 1, 2 and 3 again. The power supply 12 and the motor 13 of the driving device 10 are disposed in the housing 11, and the power supply 12 and the motor 13 are electrically connected together. The output end of the motor 13 is connected to the gear set 16, and the gear 17 of the gear set 16 faces the through hole 111 of the housing 11, such that the switch 14 is inserted into the through hole 111 and the corresponding protrusion 142 of the switch 14 is inserted into the accepting hole 171 of the gear 17, and the bolt 143 locks the switch 14 and the gear 17 together. In addition, the arm 141 of the switch 14 is disposed at outside of the housing 11. The limiting slot 152 of the securing frame 15 engages with the engaging protrusion 113 of the housing 11, the rod 22 of the handle 20 passes through the first assembling aperture 241 of the bottom board 24, such that the bottom board 24 is secured onto the handle 20. The sensor 25 is placed in the inner space 21, the sensing member 251 is disposed in the through aperture 23 of the handle 20, the containment hole 331 of the rear sleeve 33 of the securing member 30 accepts the linkage member 32, and the enlarged portion 322 of the linkage member 32 is connected to the control strip 36. Furthermore, the inner thread 332 of the rear sleeve 33 is inserted into the assembling aperture 112 of the housing 11, and the C-type hook 35 engages with the annular slot 333 of the rear sleeve 33 in the housing 11 to position the rear sleeve 33. An extending end of the control rod 36 is placed above the arm 141 of the switch 14, the front sleeve 31 passes through the assembling aperture 112 such that the outer thread 312 of the front sleeve 31 engages with the inner thread 332 of the rear sleeve 33 to combine the driving device 10 and the securing member 30 together. The rod 22 of the handle 20 is inserted into the second assembling aperture 311, the openings 242 of the bottom board 24 accept the protrusions 313 of the front sleeve 31, such that the front sleeve 31 limits the handle 20. The semi-circular portion 221 of the rod 22 is placed in the inner groove 321 of the linkage member 32, to connect the handle 20, the linkage member 32 and the control strip 36. Meanwhile, the signal cable 252 of the sensor 25 passes through the first assembling aperture 241, the second assembling aperture 311 and the linear slot 314, extends into the housing 11 through the opened slot 181 of the stopping wall 18, and then is connected to the power supply 12 and the motor 13. Finally, the cover 114 covers the housing 11 to finish the assembly. For actual installation, please refer to FIG. 4-FIG. 7. First, the typical handle on the toilet tank 40 needs to be removed to expose the assembling hole 41. The hook end 151 of the securing frame 15 of the driving device 10 is hooked onto a front sidewall of the tank 40 and the assembling aperture 112 of the housing 11 faces the assembling hole 41 of the toilet tank 40. The housing 11 is not covered with the cover 114, and the power supply 12, the motor 13, the gear set 16 and the switch 14 are all disposed in the housing 11. The handle 20 is attached onto the front sleeve 31, the outer thread 312 is inserted from outside the tank 40 through the assembling hole 41 and the assembling aperture 112 of the housing 11, the signal cable 252 of the sensor 25 is connected from the linear slot 314 to the power supply 12 and the motor 13 in the housing 11, and the rear sleeve 33 connected to the linkage member 32 and the control rod 36 is inserted through the assembling aperture 112 of the housing 11 from inside of the tank 40. Furthermore, the C-type hook 35 is secured onto the annular slot 333 of the rear sleeve 33, the outer thread 312 and the inner thread 332 of the rear sleeve 33 engages together, such that the semi-circular portion 221 of the handle 20 is placed in the inner groove 321 of the linkage member 32 and the control rod 36 is placed above the arm 141 of the switch 14. Finally, the cover 114 is placed to cover the housing 11.

Figure 8:
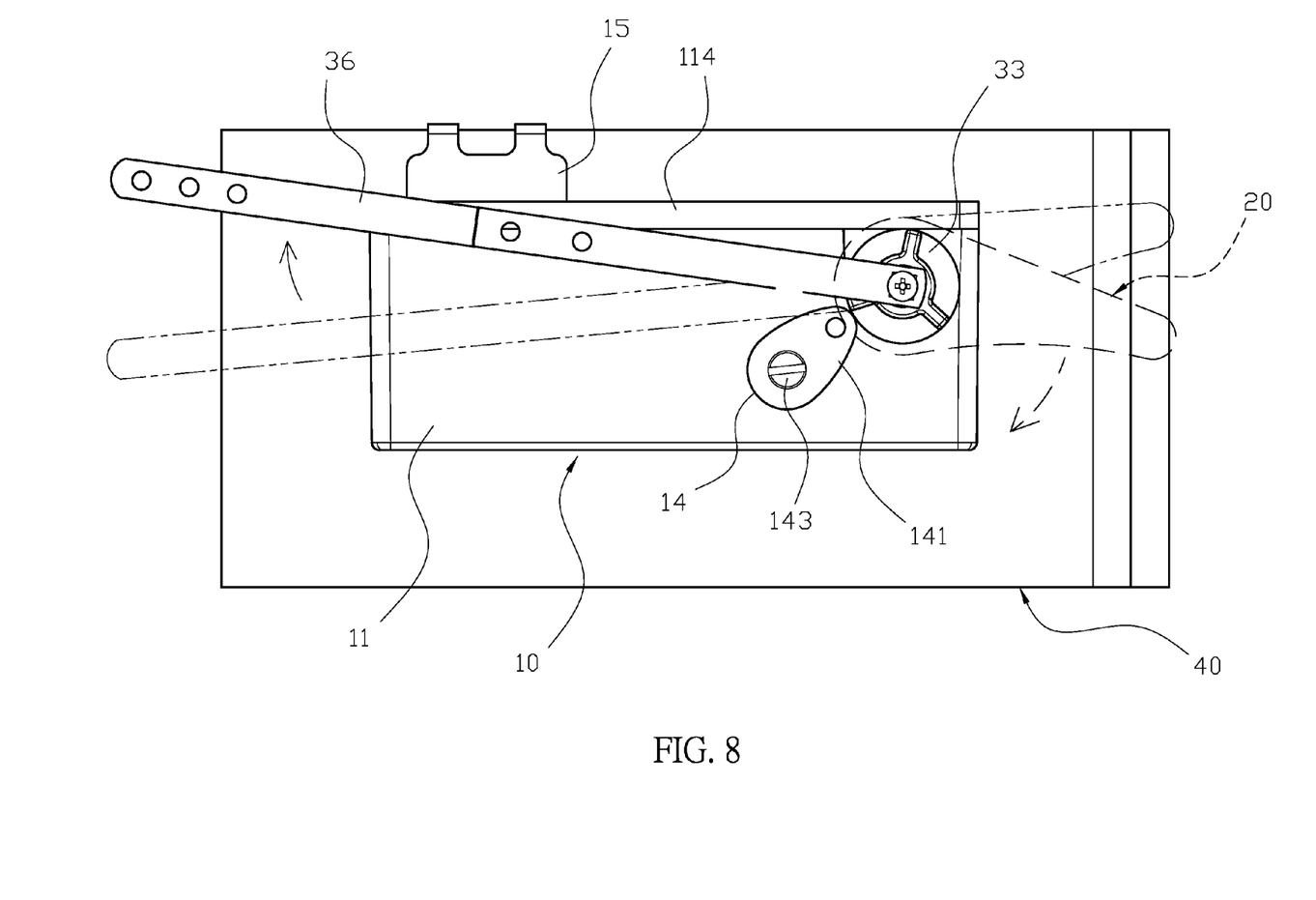
FIG. 8 is a schematic drawing of operating the embodiment of the present invention.
Figure 9:
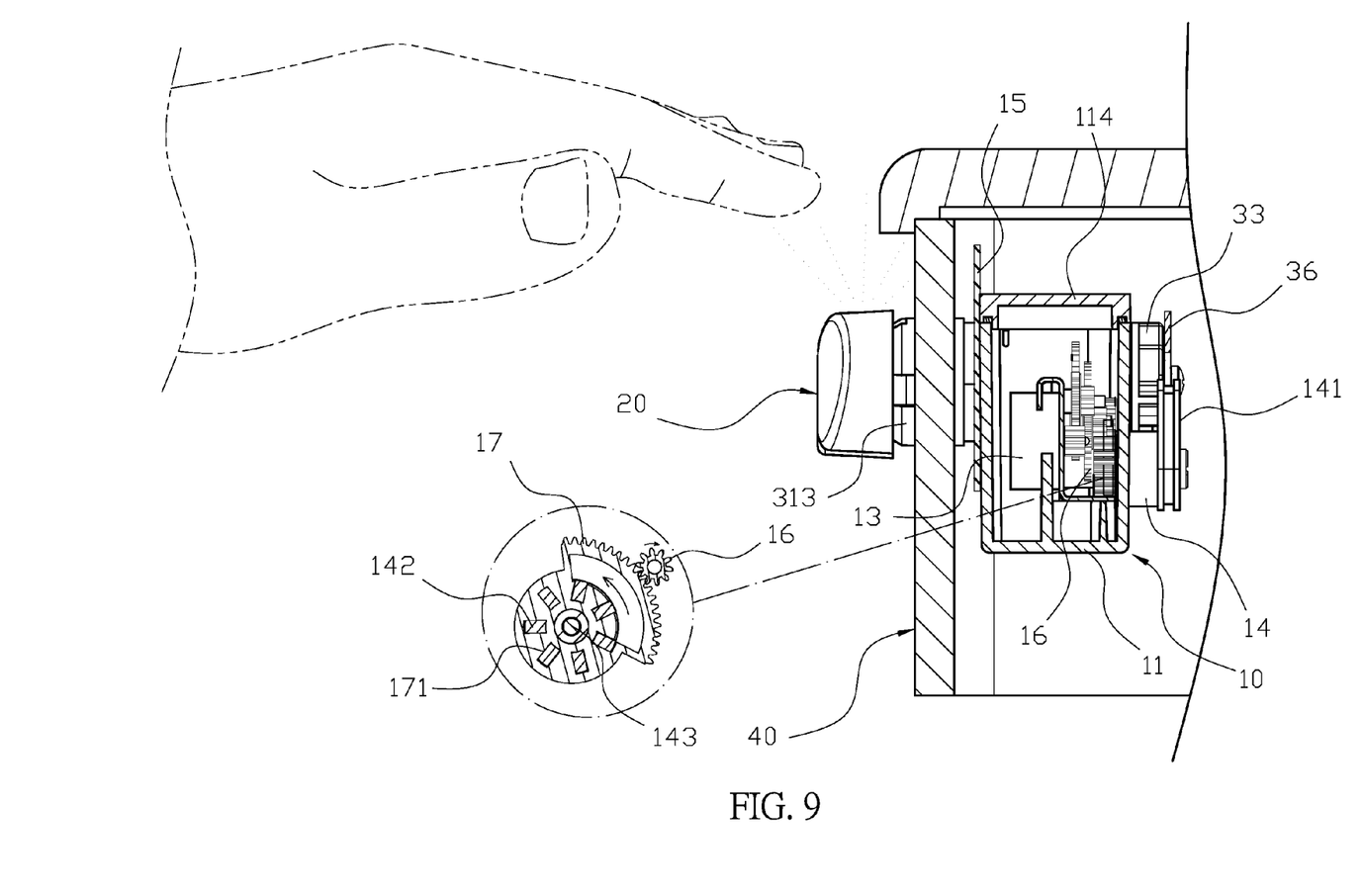
FIG. 9 is another schematic drawing of operating the embodiment of the present invention.
Figure 10:
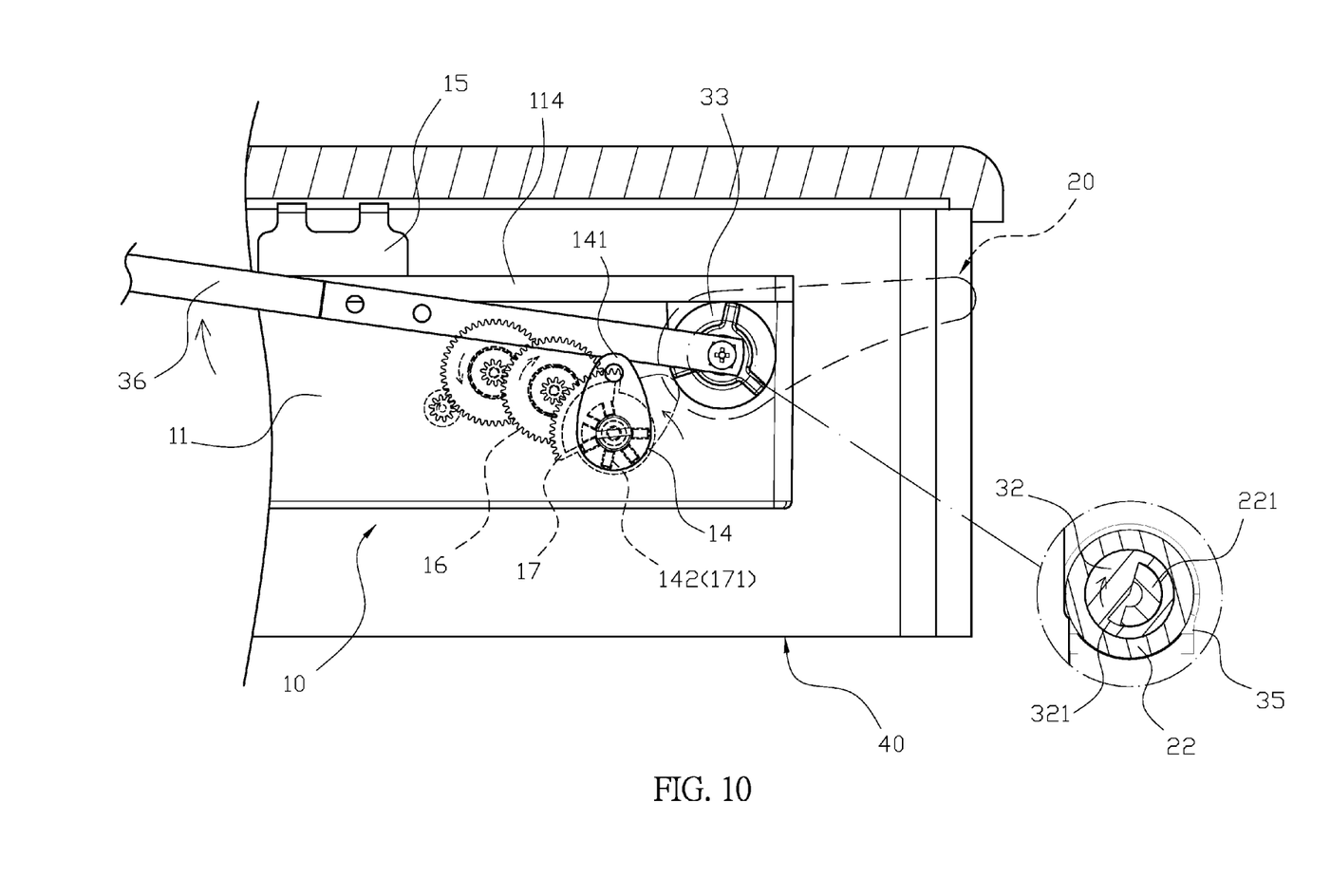
FIG. 10 is another schematic drawing of operating the embodiment of the present invention.

For actual operation, please refer to FIGS. 8, 9 and 10 with FIG. 2. To manually initiate water flush, a user can directly press the handle 20 to rotate the rod 22 so the semi-circular portion 221 of the rod 22 presses against the inner groove 321 of the linkage member 32 to rotate the rod 22 and the linkage member 32 simultaneously; then the enlarged portion 322 of the linkage member 32 rotates the control rod 36 upwardly to release the plug. To initiate automatic water flush, the user place his/her hand above the handle 20, so the sensing member 251 of the sensor 25 senses light change through the through aperture 23 of the handle 20. Since the sensing distance is between 3 cm-7 cm and the waiting time period is between 1 to 5 minute, that can prevent accidental repeat. When the sensor 25 receives the signals from the sensing member 251, the signal cable 252 makes the motor 13 to move the gear set 16, with the engagement between the accepting hole 171 of the gear 17 of the gear set 16 and the corresponding protrusion 142 of the switch 14, the arm 141 of the switch 14 is driven to rotate upwardly to push up the control rod 36 to release the plug. Furthermore, when the arm 141 pushes up the control rod 36, the inner groove 321 of the linkage member 32 has no contact with the semi-circular portion 221 of the rod 22, therefore, the handle 20 stay still during the water flush, which can save energy. Accordingly, the user can make the toilet to flush without touching the handle 20, which provides a much more hygiene environment.

Although the present invention has been explained in relation to its preferred embodiment, it is to be understood that many other possible modifications and variations can be made without departing from the spirit and scope of the invention as hereinafter claimed.

What is claimed is:
1. An automatic flush sensing assembly comprising:
a driving device having a power supply and a motor electrically connected together and disposed in a housing, the housing having a through hole, a switch connected to the motor extending through the through hole, the switch provided with a rotable arm outside of the housing, and the housing further provided with a cover and an assembling aperture;
a handle having an inner space, a rod disposed at an end of the inner space, the handle having a through aperture disposed at an upper surface and connected to the inner space; the inner space figured to be covered by a bottom board, the bottom board having a first assembling aperture corresponding to the rod; the bottom board provided with a sensor in the inner space, and the sensor having a sensing member facing the through aperture of the handle and connected to a signal cable; and
a securing member having a front sleeve, a linkage member and a rear sleeve; the front sleeve having a second assembling aperture jacketed onto the rod, an end of the front sleeve distal from the handle provided with an outer thread, a linear slot disposed adjacent to the outer thread such that the signal cable of the sensor passes through the first assembling aperture, the second assembling aperture and the linear slot; the outer thread of the front sleeve inserted into the assembling aperture of the housing, the signal cable connected to the motor and the power supply; the rear sleeve provided with a containment hole limiting the linkage member, the containment hole provided with an inner thread, another end of the rear sleeve inserted into the assembling aperture of the housing; the front sleeve and the rear sleeve locked with each other via an engagement between the inner and outer threads, an end of the linkage member connected to the rod of the handle, another end of the linkage member passing through the rear sleeve and provided with an enlarged portion, the enlarged portion secured to a control strip, the control strip disposed across and above the arm of the switch; wherein when the sensor of the handle is activated, the motor drives the switch to rotate the arm to push the control strip.

2. The automatic flush sensing assembly as claimed in claim 1, wherein an end of the rod is provided with a semi-circular portion, the linkage member provided with an inner groove facing the handle, and the inner groove is configured to accept the semi-circular portion of the rod, the inner groove having a semicircular portion with a circumference extending across 190°-210° to provide a gap between the linkage member and the rod, and when the arm pushes the control strip, the inner groove is distal from the semicircular portion such that the handle is not affected.

3. The automatic flush sensing assembly as claimed in claim 1, wherein the first assembling aperture of the bottom board is provided with a plurality of openings, another end with the outer thread of the front sleeve is provided with a plurality of protrusions surrounding the second assembling aperture, such that the protrusions of the front sleeve pass through the openings of the first assembling aperture to limit the handle and the securing member.

4. The automatic flush sensing assembly as claimed in claim 1, wherein the front sleeve is jacketed with a washer and provided with a ring portion corresponding to the washer for engagement.

5. The automatic flush sensing assembly as claimed in claim 1, wherein the driving device further comprises a plurality of engaging protrusions on an outer surface of the housing and a securing frame with a hook end and a plurality of limiting slots at another end; wherein by engaging the limiting slot and the engaging protrusion, the housing and the securing frame are secured together.

6. The automatic flush sensing assembly as claimed in claim 1, wherein an output end of the motor is connected to a gear set, and the gear set is connected to the switch; the gear set has a gear with a plurality of accepting holes, the switch further has a plurality of corresponding protrusions corresponding to the accepting holes, such that the corresponding protrusions engage with the accepting holes, and a bolt is employed to pass the switch and secure onto the gear.

7. The automatic flush sensing assembly as claimed in claim 1, wherein the housing further has a stopping wall between the assembling aperture and the through hole to protect the power supply and the motor, and the stopping wall has an open slot accepting the signal cable.

8. The automatic flush sensing assembly as claimed in claim 1, wherein the rear sleeve further has an annular slot at the end inserted into the assembling aperture, and a C-type hook corresponding to the annular slot is also provided, such that the C-type hook positions the rear sleeve onto the housing.

9. The automatic flush sensing assembly as claimed in claim 1, wherein the sensing member of the sensor transmits sensing light towards to the handle, with a distance between 3 cm-7 cm and a 5 second to 2 minute waiting time period.

10. The automatic flush sensing assembly as claimed in claim 1, wherein the sensing member is an LED structure.

* * * * *